United States Patent
Liu et al.

(10) Patent No.: US 12,324,427 B1
(45) Date of Patent: Jun. 10, 2025

(54) WEEDING METHOD OF ALTERNATELY CULTIVATING DUCKS BY BLOCK DIVIDING IN ORGANIC RICE FIELD AND APPLICATION THEREOF

(71) Applicants: Northeast Institute of Geography and Agroecology, Chinese Academy of Sciences, Changchun (CN); Daan Xinda Agriculture Development Co. LTD, Daan (CN)

(72) Inventors: Hongyuan Liu, Changchun (CN); Bolong Wen, Changchun (CN); Qianshi Wang, Daan (CN)

(73) Assignees: Northeast Institute of Geography and Agroecology, Chinese Academy of Sciences, Changchun (CN); Daan Xinda Agriculture Development Co. LTD, Daan (CN)

( * ) Notice: Subject to any disclaimer, the term of this patent is extended or adjusted under 35 U.S.C. 154(b) by 0 days.

(21) Appl. No.: 18/969,681

(22) Filed: Dec. 5, 2024

(30) Foreign Application Priority Data

Jun. 27, 2024  (CN) .......................... 202410841637.7

(51) Int. Cl.
*A01G 22/22* (2018.01)
*A01M 21/02* (2006.01)
*A01C 11/00* (2006.01)

(52) U.S. Cl.
CPC .......... *A01M 21/02* (2013.01); *A01C 11/003* (2013.01)

(58) Field of Classification Search
CPC .......... A01G 7/00; A01G 22/00; A01G 22/22; A01G 31/00; A01G 31/02; A01G 31/021; A01G 31/06; A01M 21/02; A01C 11/003; A01K 67/00; A23K 10/30; A23K 50/75
USPC ................ 47/1.01 R, 58.1 R, 58.1 FV, 59 R
See application file for complete search history.

(56) References Cited

U.S. PATENT DOCUMENTS 12,213,412 B2 *  2/2025  Huang .................. A01G 22/22

FOREIGN PATENT DOCUMENTS

| AU | 2020103564 A | 2/2021 | |
|----|---|---|---|
| CN | 1539274 A | 10/2004 | |
| CN | 103004407 A | 4/2013 | |
| CN | 105284732 A | 2/2016 | |
| CN | 107148945 A | 9/2017 | |
| CN | 107494438 A | 12/2017 | |
| CN | 107912368 A | 4/2018 | |
| CN | 110558176 A | 12/2019 | |
| CN | 111789007 A | 10/2020 | |
| CN | 112544344 A | 3/2021 | |
| CN | 113892406 A * | 1/2022 | ............. A23K 50/75 |

(Continued)

OTHER PUBLICATIONS

Translated description of CN113892406A (Year: 2022).*

(Continued)

*Primary Examiner* — Peter M Poon
*Assistant Examiner* — Danielle A Clerkley
(74) *Attorney, Agent, or Firm* — Pilloff Passino & Cosenza LLP; Rachel Pilloff; Sean Passino

(57) ABSTRACT

A weeding method of alternately cultivating ducks by block dividing in an organic rice field and an application thereof are provided. The method divides the organic rice field into blocks, and four blocks form an operation unit, and the ducklings are alternately cultivated simultaneously in each operation unit for the weeding.

3 Claims, 1 Drawing Sheet

(56) References Cited

FOREIGN PATENT DOCUMENTS

| | | |
|---|---|---|
| CN | 114680009 A | 7/2022 |
| CN | 13-115088565 A | 9/2022 |
| WO | 2022227658 A | 11/2022 |

OTHER PUBLICATIONS

Retrieval report—First search dated Jul. 31, 2024 in SIPO application No. 202410841637.7.
Retrieval report—Supplementary search dated Sep. 11, 2024 in SIPO application No. 202410841637.7.
Notification to Grant Patent Right for Invention dated Sep. 20, 2024 in SIPO application No. 202410841637.7.
Notice of first Office action dated Aug. 1, 2024 in SIPO application No. 202410841637.7.

\* cited by examiner

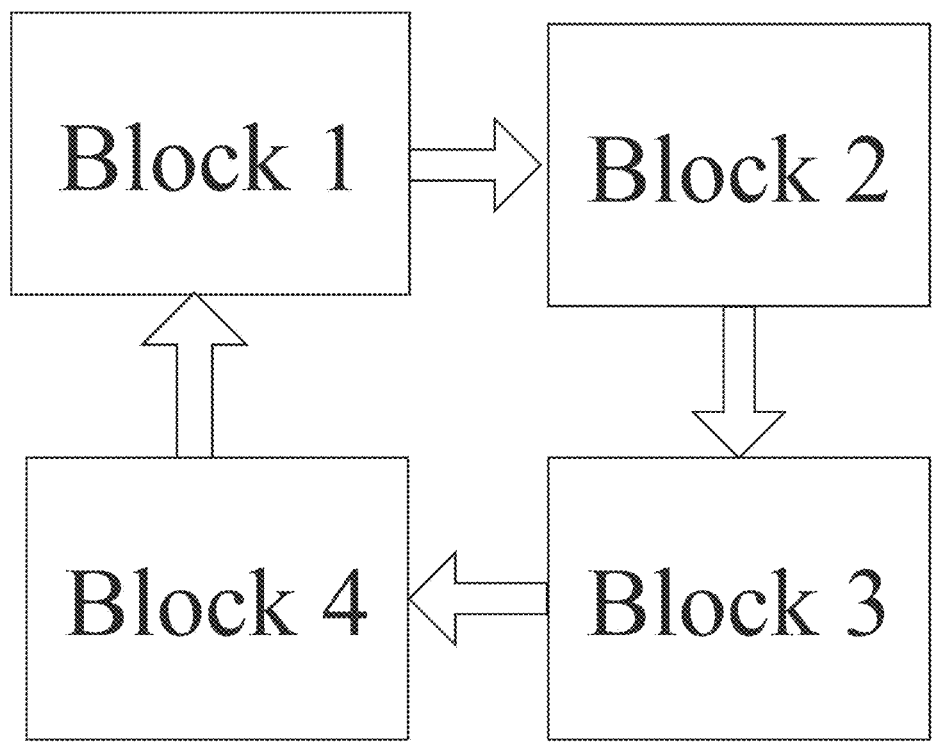

WEEDING METHOD OF ALTERNATELY CULTIVATING DUCKS BY BLOCK DIVIDING IN ORGANIC RICE FIELD AND APPLICATION THEREOF

CROSS-REFERENCE TO RELATED APPLICATIONS

This application claims priority to Chinese Patent Application No. 202410841637.7, filed on Jun. 27, 2024, the contents of which are hereby incorporated by reference.

TECHNICAL FIELD

The disclosure belongs to the technical field of organic rice production, and in particular relates to a weeding method of alternately cultivating ducks by block dividing in an organic rice field and an application thereof.

BACKGROUND

Whether weeding is capable of being effective is the key to the success or failure of organic rice production, which not only greatly determines the yield of organic rice, but also the weeding cost accounts for a very high proportion in the total production cost of organic rice, which is an important reason for the high price of organic rice. At present, weeding in organic rice production is mainly achieved by two methods.
  (1) Manual weeding, that is, manually pulling out or cutting weeds in the field. This method has the following outstanding problems: ① the efficiency of manual weeding is low, the cost is high, and the demand for human resources is extremely high. In a growing season, it takes about 10 person-days to manually weed every 667 $m^2$ of organic rice field; ② with the aging of the population structure, the available human resources show a downward trend, and the problem of no one available is gradually prominent; ③ walking in the field by manual weeding is easy to trample, squeeze or bend the rice, which becomes particularly pronounced after the rice plants have reached a height of over 50 cm during the jointing stage.
  (2) Biological weeding, that is, weeds are removed by breeding ducks, fish, crabs, etc. in rice fields. The weed removal rate of rice-duck mode may be about 90%, which may greatly reduce the weeding cost and has a high recognition in production practice. At present, the mainstream rice-duck modes, such as CN107912368A, CN110558176A, CN111789007A, CN114680009A and CN115088565A, generally require that the 10-20 ducklings are released per 667 $m^2$, the total number of ducks in each group should not exceed 100, and the rice field is divided into multiple operation units by using a partition net in advance; 10-20-day-old ducklings are released after transplanting the rice seedlings, and the ducks are driven out of the rice field at the beginning of rice heading stage. This method has the following outstanding problems.
  1. The food intake of ducks increases as they grow, which leads to the problem that no matter which density is used to release ducklings, there will be either insufficient weeding ability or the need to manually supplement the inputs that meet the organic production standards to meet the nutritional needs of ducks. For example: ① In order to always ensure a high weed removal rate, the density of ducklings needs to reach 15-20 ducklings per 667 $m^2$. However, with the growth of ducklings, the food intake increases, and in order to meet the nutritional needs of the normal survival of the ducks, artificial supplementary feeding is necessary in the middle and late stages. According to the organic rice standards, all inputs must meet the organic standards. The source and price of duck feed that has been certified or met the organic production standards have greatly increased the cost of raising ducks, seriously restricted the application of rice-duck mode in organic rice production, and even did not rule out that individual producers adopted non-standardized feeding to reduce the cost of supplementary feeding. Meanwhile, the higher the density of ducks, the more the quantity, and the cost control of ducks is also an important factor to be considered in the rice-duck mode. ② In order to avoid supplementary feeding of ducks in the middle and late stage, the density of ducklings should be no more than 10 ducklings per 667 $m^2$. However, the low density of ducks leads to poor weeding effect, especially the problem of insufficient weeding ability in the early and middle stage, which leads to the reduction of rice yield and economic losses, and the meaning of applying rice-duck weeding mode is greatly reduced.
  2. The long-term activity of ducks in a fixed plot leads to the risk of disease transmission, especially since it is inevitable that some weak ducks will die in the field. Due to the appropriate environmental temperature and humidity, dead ducks will start to rot in about 4 hours, carrion will attract flies to lay eggs, eggs will hatch maggots in about 6 hours, and maggots will become pupae in about 5 days. In this process, carrion will be produced, and maggots will carry a large number of *Clostridium botulinum*. The *Clostridium botulinum* is a neurotoxin with stable toxicity, which is not damaged in the stomach and intestines and is extremely toxic. After cating carrion or maggots, healthy ducks will suffer from systemic spasm and neck muscle paralysis due to *Clostridium botulinum* poisoning, which is called "soft neck disease". The course of disease is short and the mortality rate is high, and the mortality rate is as high as 95% within 2-48 hours after infection. Therefore, it falls into a vicious circle of rotten dead ducks, maggots, explosive infection and death of healthy ducks. The ducks may be wiped out in a few days. In order to avoid this situation, the only available way at present is to manually go to the field to find dead ducks every day and take the dead ducks out of the field for centralized treatment. However, artificially finding dead ducks in rice fields not only requires a lot of human resources, but also it is difficult to find dead ducks lying in the water, especially with the dense growth of rice and the obstruction of people's sight. Therefore, it is decided that the method of artificially finding dead ducks is time-consuming and laborious, and the dead ducks cannot be completely collected in time, which ultimately leads to the failure of rice-duck mode to achieve the expected grass control effect. CN107494438A adopted the method of not dividing the field with a partition net for 30 days in the initial stage, but feeding 30 ducklings in a large area at a density of 667 $m^2$. After 30 days, the rice field was divided into more than four operation units with a partition net, and the ducklings were fed in turn at a density of 20 ducklings per 667 $m^2$. The problem of duck epidemic spread in this stage after 30 days was solved by feeding in turn by dividing blocks. However:

① this method needs supplementary feeding for ducks in the later stage, which is feasible for conventional rice fields, but for organic rice fields, there will be the above-mentioned problem that the source and price of duck feed certified organically or conforming to organic production standards greatly increase the cost of raising ducks; ② the duckling stage is the period when ducks are most fragile and prone to death, which leads to the outbreak of epidemic disease. In order to ensure the weeding effect in the first 30 days, this method adopts 30 ducklings per 667 m² for free-range breeding, which undoubtedly leads to the high risk of epidemic disease outbreak in the early stage.

To sum up, weeding efficiency and cost are the key points that determine the future development of organic rice industry. Therefore, it is urgent to develop a weeding method of alternately cultivating ducks by block dividing in an organic rice fields, which may overcome the above problems and difficulties, achieve high weed removal rate, efficient epidemic prevention in the whole process, no need for supplementary feeding and low cost.

SUMMARY

In order to solve the above technical problems, the disclosure provides a weeding method of alternately cultivating ducks by block dividing in an organic rice fields and an application thereof. The rice field was divided into several blocks by the partition net, and every four blocks constituted an operation unit. The method of alternately cultivating ducks in different blocks in each operation unit was adopted, which realized efficient weeding, cost saving and efficiency increasing in organic rice field.

In order to achieve the above objectives, the present disclosure provides the following technical scheme.

One of the technical schemes of the disclosure is as follows:

the disclosure relates to a weeding method of alternately cultivating ducks by block dividing in an organic rice field, including the following steps: dividing the organic rice field into blocks, where every four blocks are an operation unit;

where, in each operation unit, weeding is carried out in a mode of alternately cultivating ducklings in four blocks; different operation units adopt the same alternately cultivating mode at the same time.

Preferably, four blocks in each operation unit are shaped as Chinese character "Tian".

Further, an alternately cultivating process is as follows: in the each operation unit, the ducklings are first released into a first block, and alternately cultivating for an equal time according to each of the blocks, and then alternately cultivating in each of the blocks according to a clockwise or counterclockwise circulation order, and a completion of the alternate cultivation in the four blocks means a round of alternate cultivation.

Preferably, the alternate cultivation includes multiple rounds of alternate cultivation cultivation;

during the first round of alternate cultivation, the alternate cultivation duration of ducklings in each of the blocks is 1 day;

in the subsequent alternate cultivation, the time of each round of alternate cultivation is 2 days; and alternate cultivation is carried out until the rice growth enters the initial heading stage.

Further, in the first round of alternate cultivation, in each of the blocks, it is necessary to walk slowly behind the ducklings manually to drive the ducklings, so as to ensure that the ducklings are active throughout the whole block.

Preferably, the method includes the following steps:
carrying out harrowing and mud mixing operation 1-3 days before transplanting seedlings;
transplanting the seedlings;
dividing the organic rice field into a plurality of blocks by using partition nets;
10 days after the transplanting the seedlings, releasing the ducklings in the first block of each operation unit by 20 ducklings per 667 m², where the ducklings in each of the blocks stay for one day, and then manually driven to a next block until the alternate cultivation of the four blocks in one operation unit is completed, thus completing a first round of alternate cultivation; and
after completing the first round of alternate cultivation, starting a second round of alternate cultivation, and circulating multiple rounds of alternate cultivation in turn until the rice grows and enters an initial heading stage.

Furthermore, a density of transplanting the seedlings is 30 cm in row spacing and 13.2 cm in hole spacing.

Furthermore, an area of each of the blocks is 10000±667 m².

Furthermore, during the alternate cultivation process after the first round of alternate cultivation, the activity duration of each of the blocks is 2 days.

Further, during the first round of alternate cultivation process, after being driven to the next block, it is necessary to patrol the previous block and pick up the dead ducks for centralized treatment.

The second technical scheme of the disclosure is as follows:

an application of the weeding method of alternately cultivating ducks by block dividing in an organic rice field in organic rice production.

Compared with the prior art, the disclosure has the following advantages and technical effects.

(1) For each block being operated, the duck density is 20 ducklings per 667 m², and the higher duck density ensures that the weed removal rate is not less than 85%.

(2) The growth rate of weeds is fully considered in the setting of alternate cultivation period, and the alternate cultivation period is 8 days, and the height of weeds is less than 10 cm, which may ensure the ducks to effectively eliminate weeds.

(3) Except for the first round of alternate cultivation, it is not necessary to pick up dead ducks manually in the whole process, which saves labor and money while achieving efficient epidemic prevention, and the survival rate of ducks when they leave the field is over 82%.

(4) For a complete operation unit, only 5 ducklings per 667 m² are needed on average, and the number of ducks used is much lower than that of 20 ducklings per 667 m² in the traditional rice-duck mode, so the input cost of ducks is greatly reduced, and weeds and insects in the field may meet the nutritional needs of ducks, so it is unnecessary to feed them, which further saves labor and money.

(5) The method of the disclosure may effectively kill weeds without causing harm to rice, and the yield of organic rice exceeds 4,000 kg/hectare, with obvious yield-increasing effect.

(6) In the disclosure, only a small amount of manpower is needed for duck management, which is less than 1 person-day per 667 m², and compared with manual weeding, the manpower is saved by over 90%.

BRIEF DESCRIPTION OF THE DRAWINGS

The accompanying drawings, which constitute a part of this application, are used to provide a further understanding of this application. The illustrative examples and descriptions of this application are used to explain this application, and do not constitute an improper limitation of this application.

The FIGURE is a spatial layout diagram of four blocks in each operation unit adopted in Embodiment 1 of the present disclosure.

DETAILED DESCRIPTION OF THE EMBODIMENTS

A number of exemplary embodiments of the present disclosure will now be described in detail, and this detailed description should not be considered as a limitation of the present disclosure, but should be understood as a more detailed description of certain aspects, characteristics and embodiments of the present disclosure.

It should be understood that the terminology used in the present disclosure is only for describing specific embodiments and is not used for limiting the present disclosure. In addition, for the numerical range in the present disclosure, it should be understood that each intermediate value between the upper limit and the lower limit of the range is also specifically disclosed. The intermediate value within any stated value or stated range and every smaller range between any other stated value or intermediate value within the stated range are also included in the present disclosure. The upper and lower limits of these smaller ranges may be independently included or excluded from the range.

Unless otherwise specified, all technical and scientific terms used herein have the same meaning as commonly understood by one of ordinary skill in the art to which this disclosure relates. Although the present disclosure only describes the preferred methods and materials, any methods and materials similar or equivalent to those described herein may also be used in the practice or testing of the present disclosure. All documents mentioned in this specification are incorporated by reference to disclose and describe methods and/or materials related to the documents. In case of conflict with any incorporated document, the contents of this specification shall prevail.

It is obvious to those skilled in the art that many improvements and changes may be made to the specific embodiments of the present disclosure without departing from the scope or spirit of the present disclosure. Other implementation modes obtained from the description of the present disclosure are obvious to the skilled person. The description and example of that present disclosure are exemplary only.

The terms "including", "comprising", "having" and "containing" used in this article are all open terms, which means including but not limited to.

The disclosure provides a weeding method for alternate cultivational culture ducks in organic rice fields, which includes the following steps.

(1) Harrowing and mud mixing: harrowing and mud mixing are carried out 1-3 days before transplanting seedlings.

On the one hand, the function of traditional harrowing and mud mixing to build a plough layer is realized, on the other hand, the elimination of weeds is realized. In the planting stage of seedling returning to green, rice seedlings will drift due to physical disturbance because rice is not firmly rooted in the soil, and chemical synthetic pesticides are not allowed in organic rice fields, so there is no other way to eliminate weeds at this stage. Therefore, it is extremely important to realize the physical elimination of weeds by harrowing and mud mixing before transplanting, which may leave time for the greening stage of rice seedlings after transplanting and ensure that this stage is not disturbed by weeds. The number of days ahead of the time of harrowing and mud mixing operation should be judged according to the degree of soil sedimentation. For rice fields that are easy to sink mud, it is best to carry out harrowing and mud mixing one day before transplanting seedlings, and for rice fields that are not easy to sink mud, it is best to carry out harrowing and mud mixing three days before transplanting seedlings, that is, the rice fields that are easy to sink mud are more likely to sink mud, the less number of days of harrowing and mud mixing is compared with the number of days before transplanting seedlings.

(2) Transplanting seedlings: transplanting seedlings is carried out according to the density of row spacing of 9 cun (1 cun=3.33 centimeters (cm)) (30 cm) and hole spacing of 4 cun (13.2 cm);

the spacing setting ensures the ducks to walk smoothly and realize all-round and efficient weeding.

(3) Dividing blocks by partition nets: the whole rice field is divided into several blocks with an area of $10000 \pm 667$ m$^2$ by partition nets, and each of the blocks may be composed of several rice field ponds, and every four blocks constitute an operation unit (as shown in the FIGURE).

(4) Releasing ducklings: about 10 days after transplanting, the rice seedlings establish new roots, and the 18-20-day-old robust ducklings are released in the first block of each operation unit at the rate of 20 ducklings per 667 m$^2$. The variety is Jinding Duck, which is slender and suitable for activities in rice fields. The scale of duck group should not be too large, so as to avoid the serious problem of seedling trampling caused by the clustering habit of ducks; the scale of duck group should not be too small, so as to avoid that the weeding effect may not meet the requirements.

(5) The first round of alternate cultivation: after the ducklings are released and will be active in each of the blocks for one day. Because the environment is unfamiliar, and the ducklings are small in size and relatively weak in mobility, the problem of inadequate weeding will occur if the ducklings are allowed to move freely. Therefore, it is necessary to walk slowly behind the ducks to drive the ducklings away, so as to ensure that the ducklings move throughout the whole block, and stop manual driving after the weed removal rate reaches 85%. Each of the blocks is limited for one day, on the one hand, because the weeds in the field have grown up in about 10 days during the rice seedlings' rejuvenation, and it is urgent to eliminate the weeds before they grow further, and the ability of ducks to remove weeds over 10 cm in height is obviously weakened; on the other hand, the ducklings that have just been released into the block will not die on the first day, but they will die suddenly on the second day because of the need to adapt to the unfamiliar environment. According to the time law of duck death, decay and maggots' generating process in the background art, it is easy to have an epidemic outbreak when they are stationed in the same block for two days at this stage, so the first round of alternate cultivation requires each of the blocks to last for one day. In the process of driving the ducklings into the next block, it is necessary to pick out the weak ducks that cannot keep up with the duck group or have broken legs to concentrate them in other areas for temporary breeding. During this period, appropriate amount of feed that meets the organic standards should be supplemented. Dead ducks should be treated centrally, and healthy ducklings should be released back into the duck group after cultivation. After the duck group enters the next block, it is necessary to patrol the field in the previous block and collect the missing dead ducks for centralized treatment. At this stage, the rice seedlings are short and the field view is good, so it is easy to find dead ducks.

(6) The second and subsequent alternate cultivation: the second alternate cultivation will be started on the fifth day, and the duck group will be active in each of the blocks for 2 days from the second round. This time limit is determined because the duck group gradually adapts to the environment and the survival ability is improved, and after four selections in the first round, the remaining ducklings are physically strong and adaptable, and basically will not die within two days. At the same time, an alternate cultivation period is 8 days, the height of weeds is less than 10 cm, which may ensure that the weeding effect of ducks may reach more than 85%. At this stage, in the process of driving the ducklings into the next block, it is necessary to pick out the weak ducks that cannot keep up with the duck group or have broken legs and concentrate them in other areas for temporary breeding. In the meantime, appropriate amount of feed that meets the organic standards should be supplemented. Dead ducks need to be treated centrally, and healthy ducklings should be released back into the duck group after cultivation. After the ducks enter the next block, there is no need to perform field inspection on the dead ducks in the previous block, because the time for the ducks to return to the block again is 6 days later, even if there are dead ducks left, the decomposition has been completed after 6 days, and all the maggots have become pupae, so the problem of poisoning live ducks will not occur.

(7) The ducks leave the field: the rice grows at the initial heading stage, and the duck group are driven out of the rice field.

The disclosure also provides an application of the weeding method of alternately cultivating ducks by block dividing in an organic rice field in organic rice production.

All the raw materials used in the embodiment of the disclosure are obtained by commercial purchase.

The technical scheme of the present disclosure will be further explained by examples.

Embodiment 1

The rice field used in this embodiment is located in Lianhe Township, Da'an City, Jilin Province, with an area of 32 hectares:
(1) Harrowing and mud mixing: harrowing and mud mixing are carried out 2 days before transplanting seedlings.
(2) Transplanting seedlings: transplanting seedlings is carried out according to the density of row spacing of 9 cun (30 cm) and hole spacing of 4 cun (13.2 cm).
(3) Dividing blocks by partition nets: the whole rice field is divided into 32 blocks with an area of 10,000 m² by partition nets, and every four blocks form an operation unit, with a total of 8 operation units.
(4) Releasing ducklings: 10 days after transplanting seedlings, 20-day-old healthy ducklings with an amount of 300 are released in the first block of each operation unit, and the variety is Jinding Duck.
(5) The first round of alternate cultivation: after the ducklings are released, they are driven by manual walking slowly behind the ducks to ensure that the ducklings are active throughout the whole block, and the manual driving is stopped after the weed removal rate reaches 85%. Each of the blocks is limited for one day. In the process of driving the ducklings into the next block, it is necessary to pick out the weak ducks that cannot keep up with the duck group or have broken legs to concentrate them in other areas for temporary breeding. During this period, appropriate amount of feed that meets the organic standards should be supplemented. Dead ducks should be treated centrally, and healthy ducklings should be released back into the duck group after cultivation. After the duck group enters the next block, it is necessary to patrol the field in the previous block and collect the missing dead ducks for centralized treatment. At this stage, the rice seedlings are short and the field view is good, so it is easy to find dead ducks.
(6) The second and subsequent alternate cultivation: the second alternate cultivation is started on the fifth day, and the duck group will be active in each of the blocks for 2 days from the second round. At this stage, in the process of driving the ducklings into the next block, it is necessary to pick out the weak ducks that cannot keep up with the duck group or have broken legs and concentrate them in other areas for temporary breeding. In the meantime, appropriate amount of feed that meets the organic standards should be supplemented. Dead ducks need to be treated centrally, and healthy ducklings should be released back into the duck group after cultivation. After the ducks enter the next block, there is no need to perform field inspection on the dead ducks in the previous block.
(7) Duck group leaves the field: on August 10th, the rice growth enters the initial heading stage, and the ducks are driven out of the rice field and the weed density is observed.

Results: when the duck group leaves the field, the weed removal rate is 87%, the survival rate of the ducks is 88%, the manpower is 320 person-days, with an average of 0.7 person-day per 667 m², and the rice yield is 4,195 kg/ha.

Embodiment 2

The rice field used in this embodiment is located in Dagangzi Town, Da'an City, Jilin Province, with an area of 12 hectares:
(1) Harrowing and mud mixing: harrowing and mud mixing are carried out 3 days before transplanting seedlings.
(2) Transplanting seedlings: transplanting seedlings is carried out according to the density of row spacing of 9 cun (30 cm) and hole spacing of 4 cun (13.2 cm).
(3) Dividing blocks by partition nets: the whole rice field is divided into 12 blocks with an area of 10,000 m² by partition nets, and every four blocks form an operation unit, with a total of 3 operation units.
(4) Releasing ducklings: 10 days after transplanting seedlings, 18-day-old healthy ducklings with an amount of 300 are released in the first block of each operation unit, and the variety is Jinding Duck.

(5) The first round of alternate cultivation: after the ducklings are released, the ducklings are driven by manual walking slowly behind the ducks to ensure that the ducklings are active throughout the whole block, and the manual driving is stopped after the weed removal rate reaches 85%. Each of the blocks is limited for one day. In the process of driving the ducklings into the next block, it is necessary to pick out the weak ducks that cannot keep up with the duck group or have broken legs to concentrate them in other areas for temporary breeding. During this period, appropriate amount of feed that meets the organic standards should be supplemented. Dead ducks should be treated centrally, and healthy ducklings should be released back into the duck group after cultivation. After the duck group enters the next block, it is necessary to patrol the field in the previous block and collect the missing dead ducks for centralized treatment. At this stage, the rice seedlings are short and the field view is good, so it is easy to find dead ducks.

(6) The second and subsequent alternate cultivation: the second alternate cultivation is started on the fifth day, and the duck group will be active in each of the blocks for 2 days from the second round. At this stage, in the process of driving the ducklings into the next block, it is necessary to pick out the weak ducks that cannot keep up with the duck group or have broken legs and concentrate them in other areas for temporary breeding. In the meantime, appropriate amount of feed that meets the organic standards should be supplemented. Dead ducks need to be treated centrally, and healthy ducklings should be released back into the duck group after cultivation. After the ducks enter the next block, there is no need to perform field inspection on the dead ducks in the previous block.

(7) Duck group leaves the field: on August 10th, the rice growth enters the initial heading stage, and the ducks are driven out of the rice field and the weed density is observed.

Results: when the duck group leaves the field, the weed removal rate is 85%, the survival rate of the ducks is 82%, the manpower are 145 person-days, with an average of 0.8 person-day per 667 $m^2$, and the rice yield is 4,015 kg/ha.

Comparative Example 1

The comparative example adopts manual weeding, and the rice field is located in Lianhe Township, Da'an City, Jilin Province, with an area of 5 hectares:
(1) Harrowing and mud mixing: harrowing and mud mixing are carried out 2 days before transplanting seedlings.
(2) Transplanting seedlings: transplanting seedlings is carried out according to the density of row spacing of 9 cun (30 cm) and hole spacing of 4 cun (13.2 cm).
(3) Weeding: weeds are pulled and cut manually on June 15th, June 25th, July 10th, July 20th and August 2nd respectively.
(4) Weed observation: weed density is observed on August 10th.

Results: the weed removal rate is 85% at the heading stage of rice, and the manpower is 782 person-days, with an average of 10.4 person-day per 667 $m^2$, and the rice yield is 3,630 kg/ha.

Comparative Example 2

The comparative example adopts the traditional rice-duck mode, and the rice field is located in Lianhe Township, Da'an City, Jilin Province, with an area of 10 hectares:
(1) Harrowing and mud mixing: harrowing and mud mixing are carried out 2 days before transplanting seedlings.
(2) Transplanting seedlings: transplanting seedlings is carried out according to the density of row spacing of 9 cun (30 cm) and hole spacing of 4 cun (13.2 cm).
(3) Dividing blocks by partition nets: the whole rice field is divided into 10 blocks with an area of 10,000 $m^2$ by partition nets.
(4) Releasing ducklings: 10 days after transplanting seedlings, 20-day-old healthy ducklings with an amount of 300 are released in each of the blocks, with a total of 3,000 ducklings.
(5) Supplementary feeding in the field: the undernourished ducks are observed and the feed permitted for organic rice production is supplemented.
(6) Duck group leaves the field: on August 10th, the rice growth enters the initial heading stage, and the ducks are driven out of the rice field.

Results: when the duck group leaves the field, the weed removal rate is 20%, the survival rate of the ducks is 22%, and the manpower is 48 person-days, with an average of 0.3 person-day per 667 $m^2$, and the rice yield is 2,185 kg/ha.

Comparative Example 3

This comparative example adopts the rice-duck mode of CN107494438A, and the rice field is located in Lianhe Township, Da'an City, Jilin Province, with an area of 4 hectares:
(1) Harrowing and mud mixing: harrowing and mud mixing are carried out 2 days before transplanting seedlings.
(2) Transplanting seedlings: transplanting seedlings is carried out according to the density of row spacing of 9 cun (30 cm) and hole spacing of 4 cun (13.2 cm).
(3) Releasing ducklings: 10 days after transplanting seedlings, 20-day-old healthy ducklings with an amount of 4,500 are released, and the variety is Jinding Duck.
(4) Dividing blocks by partition nets: the whole rice field is divided into 4 blocks with an area of 10,000 $m^2$ by partition nets.
(5) alternate cultivation in different blocks: 300 ducks are released in one of the blocks and alternate cultivation is carried out in each block. The surplus ducks in the free-range stage before dividing blocks by partition nets are directly sold.
(5) Supplementary feeding in the field: the undernourished ducks are observed and the feed permitted for organic rice production is supplemented.
(6) Duck group leaves the field: on August 10th, the rice growth enters the initial heading stage, and the ducks are driven out of the rice field.

Results: the weed removal rate is 28% when the duck group leaves the field, the survival rate of the ducks in the free-range stage before dividing blocks by partition nets is 30%, the survival rate of the ducks in the alternate cultivation stage by dividing blocks is 92%, the overall survival rate of the ducks is 27.6%, the the manpower is 73 person-days, with an average of 0.5 person-day per 667 $m^2$, and the rice yield is 2,420 kg/ha.

Comparative Example 4

No weeding measures are taken in this comparative example, and the rice field is located in Lianhe Township, Da'an City, Jilin Province, with an area of 0.5 hectares:

(1) Harrowing and mud mixing: harrowing and mud mixing are carried out 2 days before transplanting seedlings.
(2) Transplanting seedlings: transplanting seedlings is carried out according to the density of row spacing of 9 cun (30 cm) and hole spacing of 4 cun (13.2 cm).
(3) Weeding measures: no weeding measures are taken to compare the weeding effects of other treatments.
(4) Weed observation: weed density is observed on August 10th.

Results: the rice yield is 1,780 kg/ha.

The weeding effects of the methods adopted in Embodiments 1-2 and Comparative examples 1~4 are shown in Table 1.

TABLE 1

Weed density and removal rate treated in Embodiments 1-2 and Comparative examples 1-4

| NO. | Treatment | Weed density (plant/m$^2$) | Weed removal rate (%) |
| --- | --- | --- | --- |
| Embodiment 1 | The disclosure | 20.0 | 87% |
| Embodiment 2 | The disclosure | 23.4 | 85% |
| Comparative example 1 | manual weeding | 23.4 | 85% |
| Comparative example 2 | Traditional rice-duck mode | 124.0 | 20% |
| Comparative example 3 | Rice-duck mode of CN107494438A | 112.0 | 28% |
| Comparative example 4 | No weeding | 155.7 | — |

Conclusion: according to Table 1, it can be seen that a weeding method of alternately cultivating ducks by block dividing in an organic rice fields disclosed by the present disclosure significantly reduces the weed density, improves the weed removal rate, keeps the weed removal rate above 85%, and further improves the yield of organic rice fields. In addition, weeding by the alternate cultivation by dividing blocks also reduces the daily labor, that is, reduces the labor cost, which has a wide application value.

The above is only the preferred embodiment of this application, but the protection scope of this application is not limited to this. Any change or replacement that may be easily thought of by a person familiar with this technical field within the technical scope disclosed in this application should be included in the protection scope of this application. Therefore, the protection scope of this application should be based on the protection scope of the claims.

What is claimed is:

1. A weeding method of alternately cultivating ducklings by block dividing in an organic rice field, wherein the organic rice field is divided into a plurality of blocks, every four blocks of the plurality of blocks define an operation unit;

the method comprises the following steps:

harrowing and mud mixing the organic rice field 1-3 days before transplanting rice seedlings;

transplanting the rice seedlings into the organic rice field;

dividing the organic rice field into a plurality of blocks, wherein each block of an operation unit is partitioned using partition nets;

10 days after transplanting the rice seedlings, releasing the ducklings into a first block of each operation unit at a density of 20 ducklings/667 m$^2$, wherein the ducklings in each of the first blocks stay for one day, and then the ducklings are manually driven to a next block of the operation unit, wherein the ducklings in each of a second block of each operation unit stay for one day until alternate cultivation of the four blocks in one operation unit is completed, thus completing a first round of alternate cultivation;

during the first round of alternate cultivation, after the ducklings enter the next block, field inspection is carried out in the previous block to pick up missing or dead ducklings for centralized treatment; and after completing the first round of alternate cultivation, starting a second round of alternate cultivation, wherein the ducklings remain in each block for two days during the second and subsequent rounds; and circulating multiple rounds of alternate cultivation until the rice seedlings grow and enter an initial heading stage.

2. The weeding method of alternately cultivating ducklings by block dividing in the organic rice field according to claim 1, wherein a density of transplanting the rice seedlings is 30 cm in row spacing and 13.2 cm in hole spacing.

3. The weeding method of alternately cultivating ducklings by block dividing in the organic rice field according to claim 1, wherein an area of each block is 10000±667 m$^2$.

* * * * *